United States Patent
Ham et al.

(10) Patent No.: US 8,446,658 B2
(45) Date of Patent: May 21, 2013

(54) APPARATUS AND METHOD FOR OPTICAL SWITCHING IN METAMATERIALS

(75) Inventors: Byoung Seung Ham, Incheon (KR); Hua Xu, Incheon (KR)

(73) Assignee: Inha-Industry Partnership Institute, Incheon (KR)

( * ) Notice: Subject to any disclaimer, the term of this patent is extended or adjusted under 35 U.S.C. 154(b) by 161 days.

(21) Appl. No.: 13/024,153

(22) Filed: Feb. 9, 2011

(65) Prior Publication Data

US 2012/0120474 A1    May 17, 2012

(30) Foreign Application Priority Data

Nov. 11, 2010  (KR) .......................... 10-2010-0112041

(51) Int. Cl.
*G02F 1/03*    (2006.01)

(52) U.S. Cl.
USPC .......................................................... 359/257

(58) Field of Classification Search
USPC ................. 359/237, 238, 240, 245, 246, 257, 359/320, 388, 484.06
See application file for complete search history.

(56) References Cited

U.S. PATENT DOCUMENTS

| | | | | |
|---|---|---|---|---|
| 3,502,875 A | * | 3/1970 | Torla et al. | ..................... 250/332 |
| 4,701,006 A | * | 10/1987 | Perlmutter | ......................... 359/9 |
| 7,649,667 B2 | * | 1/2010 | Bergmann et al. | ............ 359/257 |
| 2004/0156415 A1 | * | 8/2004 | Palese et al. | ..................... 372/92 |
| 2010/0277791 A1 | * | 11/2010 | Bratkovski | .................... 359/279 |

OTHER PUBLICATIONS

Zayats et al., Nano-Optics of Surface Plasmon Polaritons, Phys. Rep., vol. 408, pp. 131-314, 2005.
Nozaki et al., Sub-Femtojoule All-Optical Switching Using a Photonic-Crystal Nanocavity, Nat. Photonics, vol. 4, pp. 477-483, 2010.
Large et al., Photoconductively Loaded Plasmonic Nanoantenna as Building Block for Ultracompact Optical Switches, Nano Lett., vol. 10, pp. 1741-1746, 2010.
Harris, Electromagnetically Induced Transparency, Phys. Today, vol. 50, pp. 36, 1997.
Zhang et al., Plasmon-Induced Transparency in Metamaterials, Phys. Rev. Lett., vol. 101, pp. 047401, 2008.
Liu et a., Plasmonic Analogue of Electromagnetically Induced Transparency at the Drude Damping Limit, Nat. Mater., vol. 8, pp. 758-762, 2009.

* cited by examiner

*Primary Examiner* — Tuyen Tra
(74) *Attorney, Agent, or Firm* — Rabin & Berdo, P.C.

(57) ABSTRACT

An optical switch combining a Pockels cell and a metamaterial, wherein polarization of an incident light is controlled by a voltage on the Pockels cell to block or pass the incident light. The optical switch has advantages of small size, fast switching, simple structure, and high stability. A plasmonic-EIT kind of optical switch is based on plasmonic hybridization and a plasmonic interaction is controlled by altering a polarization state of the incident light. Therefore, the incident light can be selectively allowed to pass through or blocked according to the polarization thereof.

13 Claims, 3 Drawing Sheets

APPARATUS AND METHOD FOR OPTICAL SWITCHING IN METAMATERIALS

CROSS-REFERENCE TO RELATED ED APPLICATIONS

The present application claims priority under U.S.C. 119 to Korean Patent Application No. 10-2010-0112041, filed on Nov. 11, 2010, the disclosure of which is expressly incorporated by reference herein in its entirety.

BACKGROUND OF THE INVENTION

1. Field of the Invention

The present invention relates, in general, to an optical switch using polarization control of light and a method thereof; and more particularly to a technology that combines plasmonic electromagnetically induced transparency (EIT) and polarization hybridization to provide an optical switch by using a voltage-controlled Pockels cell to rotate the polarization of a passing beam.

2. Description of the Related Art

An optical switch is a switch that enables signals in optical fibers or integrated optical circuits to be selectively switched from one circuit to another, which is a key component in an optical network. The optical switch based on nonlinear optical effect has received much attention; however, it is only to a limited extent depending on a device size and light intensity thereof.

It is found that electromagnetic fields can be localized by utilizing a defect of photonic crystals, thereby enhancing nonlinearity effects (see Zayats, Phys. Rep. Vol. 408, pp. 131-314, 2005). Also, Nozaki et al. proposed combining an ultrasmall photonic-crystal nanocavity and strong carrier-induced nonlinearity in InGaAsP to produce the optical switch (see Nozaki, Nat. Photonics Vol. 4 pp. 477-483, 2010). Further, the excitation of surface plasmon polaritons can alternatively be used to localize the electromagnetic fields. For instance, Large et al. proposed a new concept of ultrafast optical switches based on nonlinear plasmonic nanoantennas (see Large, Nano Lett. Vol. 10, pp. 1741-1746, 2010). The prior art methods described in the above, although being based on different principles and mechanisms, share a common technique to shift a resonant frequency by using another coupling beam to switch a pathway of a passing beam.

Electromagnetically induced transparency (EIT) proposed by Harris has been intensively studied due to its various applications such as for slow light or optical switches, in the field of photon information processing. The EIT, as a direct result of quantum destructive interference between alternative pathways, renders an ultra low absorption (see Harris, Phys. Today Vol. 50, pp. 36, 1997). Zhang et al. proposed the plasmonic EIT in metamaterials in 2008 (see Zhang, Phys. Rev. Lett. Vol. 101, pp. 047401, 2008), which is experimentally realized in 2009 (see Liu, Nat. Mater. Vol. 8, pp. 758-762, 2009). In the metamaterials, a plasmonic interaction in a near-field zone replaces the role of a coupling beam in the conventional EIT. The coupling becomes intrinsically induced and are not selectively excited and therefore, it is no longer suitable for the optical switch.

SUMMARY OF THE INVENTION

Accordingly, the present invention has been made in view of the above problems, and an object of the present invention is to provide a polarization-controlled plasmonic electromagnetically induced transparency (EIT) and a method thereof, which can be applied to optical switches for use in various fields of, for example, optical communication and photon information processing, thereby achieving a small size, fast operation speed, simple structure, and high stability of the optical switch.

Unlike commercialized magneto-optical switches which use a polarization beam splitter, the optical switch according to the present invention instead uses metamaterials having a size on the order of hundreds of nanometers. The metamaterial includes unit cells that are arranged in a lattice like artificial atoms, the size of the unit cell being much smaller than external electromagnetic waves that can be considered as a homogeneous media. In one embodiment, for example, a gold or silver strip can be used as a building block of the metamaterials. The unit cell comprises a single metal strip and a pair of metal strips positioned perpendicular to the single metal strip having a photopolymer (PC403) as a filler, the unit cells being arranged in the lattice on a glass ($SiO_2$).

The pair of the metal strips in a lower layer has rather a unique property in that the pair of the metal strips is not directly excited by an external incident light having an electric component perpendicular thereto, but can be activated through a near-field coupling when the single metal strip is vertically placed relative to the pair of the metal strips, thereby forming an asymmetric plasmonic mode. In contrast, if the electric component of the incident light is parallel to the pair of the metal strips, the pair is directly coupled with the incident beam, and a symmetric plasmonic mode is generated. The frequency of the asymmetric mode is generally lower than that of the symmetric mode. However, a frequency inversion can occur if each of the pair of the metal strips has a longitudinal displacement ($\Delta$). Therefore, it is possible to control the frequency of the asymmetric mode and the frequency of the symmetric mode to overlap each other by adjusting the longitudinal displacement ($\Delta$). In addition, the single strip in an upper layer needs to have the same resonant frequency as that of the pair of the single strip in the lower layer, and to this end, a variable of the metal strips such as, for example, a length thereof is controlled.

When the electric component of the incident beam is parallel to the single strip (and perpendicular to a direction of the pair of the metal strips), the single strip in the upper layer resonates with an external field, which has an effect of plasmonic coupling (i.e., dipole-quadrupole coupling), where the pair of the metal strips in the lower layer is not excited by the incident beam. As a result, the upper strip destructively interferes with the lower pair, and the EIT is generated. Likewise, the incident beam can traverse the metamaterial with a low loss and the optical switch is set to be "open."

When the electric component of the incident beam is perpendicular to the single strip (and parallel to the direction of the pair of the metal strips), the lower pair of the metal strips is directly excited by the external incident beam without any plasmonic couplings occurring in the near-field zone. Consequently, light cannot substantially propagate without involvement of destructive interference, and the optical switch is set to be "off." The device according to the present invention has an ultrahigh speed due to a response speed of surface plasmon polaritons, which is typically tens of femtoseconds. However, there still exists a need for an additional component to control the polarization of a passing beam such that the speed of the optical switch is determined according to a method of rotating the polarization. Several approaches can be utilized based on an electric or optical field. Here, for example, a Pockels cell can be used to control the polarization of the incident light based on a voltage applied thereto.

In one aspect of the present invention, provided is an optical switch, in which a Pockels cell and a metamaterial are combined, wherein polarization of an incident light is controlled by a voltage on the Pockels cell to block or pass the incident light.

In another aspect of the present invention, provided is a method of providing an optical switch, in which a Pockels cell and a metamaterial are combined, wherein polarization of an incident light is controlled by a voltage on the Pockels cell to block or pass the incident light.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF EMBODIMENTS

Hereinafter, embodiments of a polarization-dependent optical switch according to the present invention will be described with reference to the attached drawings. Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein. Accordingly, example embodiments are to cover all modifications, equivalents, and alternatives falling within the scope of the invention.

It will be understood that, although the terms first, second, etc. may be used herein to describe various elements, these elements should not be limited by these terms. These terms are only used to distinguish one element from another.

It will be understood that, when a feature or element is referred to as being "connected" or "coupled" to another feature or element, it can be directly connected or coupled to the other element or intervening elements may be present. In contrast, when a feature or element is referred to as being "directly connected" or "directly coupled" to another element, there are no intervening elements present.

The terminology used herein is for the purpose of describing particular embodiments only and is not intended to be limiting of example embodiments of the invention. It will be understood that the terms "comprises," or "includes," when used herein, specify the presence of stated features, integers, steps, operations, elements, and/or components, but do not preclude the presence or addition of one or more other features, integers, steps, operations, elements, components, and/or groups thereof.

Like numbers are used throughout the drawings to refer to the same or like parts, and a repetitive explanation will be omitted. Detailed descriptions of well-known functions and structures incorporated herein may be omitted to avoid obscuring the subject matter of the present invention.

Figure 1:
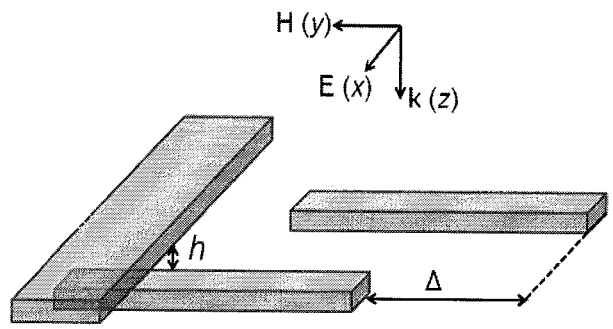
FIG. 1 is a schematic diagram showing a unit cell of metamaterial according to one embodiment of the present invention.

A schematic view of a unit cell according to one embodiment of the present invention is shown in FIG. 1. The unit cell comprises a single metallic strip and a pair of strips vertically with the photopolymer (PC403) as filler, which is periodically arranged on glass ($SiO_2$). A beam is incident on metamaterial, wherein the beam has an electric component parallel to a single strip, which is referred to as an "s" polarization. In this embodiment, a lower pair of metal strips is not directly excited by the incident beam. Instead, an upper single strip is coupled with the incident beam, which serves as an optical dipole antenna. As a result of near-field interaction, the upper strip indirectly excites the lower pair of the metal strips to generate an asymmetric plasmonic mode. Accordingly, the upper strip resorts to plasmonic coupling (i.e., dipole-quadrupole coupling). As a result, the upper strip destructively interferes with the lower pair and EIT is generated. Equivalently, the incidence can traverse the metamaterial with a low loss, a transmittance of up to about 86.9% is achieved at a wavelength of 687 nm, and an optical switch is turned on.

By rotating the electric component by 90 degrees to be perpendicular to the single strip, a "p" polarization is defined. As a result, a symmetric mode is formed in the lower pair through direct coupling between the external incident beam and the lower pair, without any plasmonic couplings in the near-field zone. Consequently, light cannot substantially propagate without the involvement of destructive interference. Thus, only about 2% of the incident beam can propagate through the metamaterial, and the optical switch is turned off.

In general, the symmetric mode and an asymmetric mode do not coexist at the same frequency. Here, in this embodiment, a longitudinal shift ($\Delta$) is introduced such that the resonant frequency can be tuned to 687 nm. The resonant frequency of the upper strip is adjusted to the same frequency by modifying the length of the strip, such that the asymmetric mode can be excited through the near-field plasmonic interaction.

Figure 2:
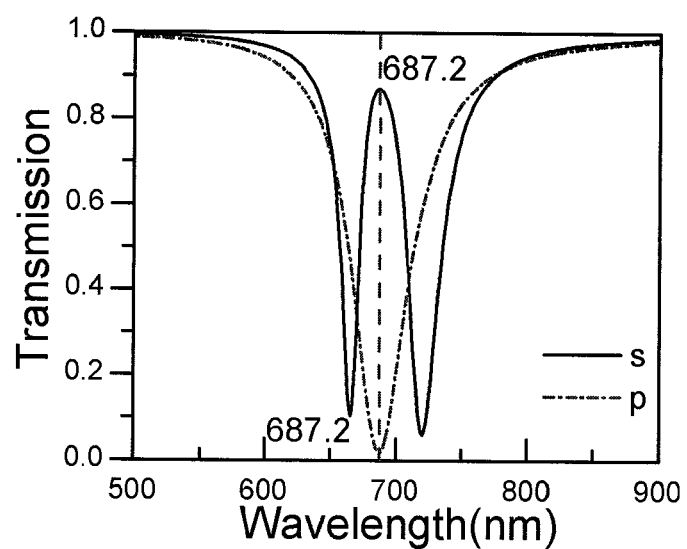
FIG. 2 illustrates simulated results of the metamaterial shown in FIG. 1.

FIG. 2 shows simulated results for both polarizations. An optical modulation effect can be evaluated by a differential transmission, which is expressed by the following equation:

$$\frac{\Delta T}{T}(\lambda) = \frac{T_{on}(\lambda)}{T_{off}(\lambda)} - 1,$$

where $T_{on}$ and $T_{off}$ are transmissions of the passing beam according to a turn-on voltage and a turn-off voltage, respectively. According to the above equation, the modulation is calculated as 44.7% in this metamaterial at the wavelength of 687 nm.

Figure 3:
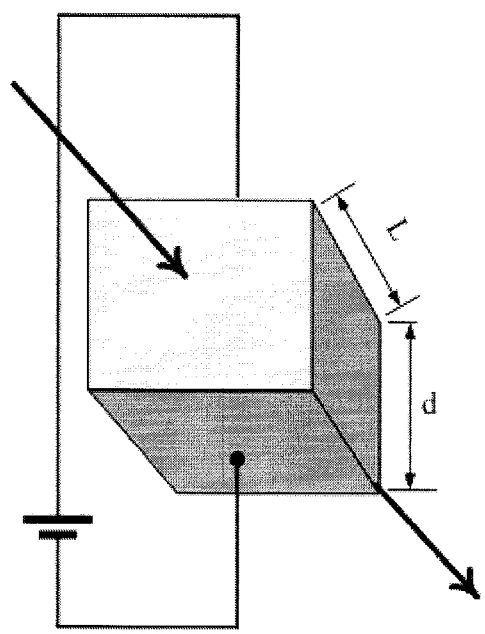
FIG. 3 is a diagram showing a Pockels cell according to one embodiment of the present invention.

FIG. 3 shows a schematic diagram of a Pockels cell according to one embodiment of the present invention, which is used to modulate the phase and the polarization of an incident light. When a beam of light traverses a Pockels cell of length L to which a voltage is used, it undergoes a phase shift, $$\varphi \approx \varphi_0 - \pi \frac{V}{V_\pi},$$

where $\phi_0 = 2\pi nL/\lambda_0$ and $$V_\pi = \frac{d}{L}\frac{\lambda_0}{rn^3}$$

is the half-wave voltage which is the applied voltage at which the phase shift changes by $\pi$. $\lambda_0$ is the free-space wavelength, r is the Pockels coefficient, n is the refractive index of the electro-optic medium. The parameter $V_\pi$ is an important characteristic of the modulator. It depends on the material properties (n and r), on the wavelength $\lambda_0$ and the size scale d/L, where d is the height of the Pockels cell and L is the length of the Pockels cell. $NH_4H_2PO_4$ (ADP), $KH_2PO_4$ (KDP), $LiNbO_3$, $LiTaO_3$, and CdTe are usually used for a crystal of the Pockels cell. Here, in this embodiment, Ti-doped $LiNbO_3$ is used for the crystal of the Pockels cell. If d<<L, only a relatively lower level of voltage is needed for the half-wave voltage and the modulation speed above 100 GHz is attainable.

Figure 4A:
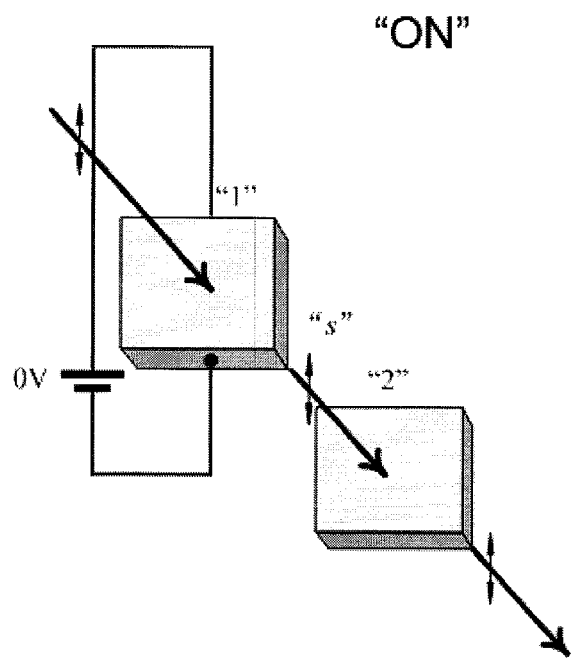
FIGS. 4A and 4B are diagrams showing a polarization-dependent optical switch according to one embodiment of the present invention.
Figure 4B:
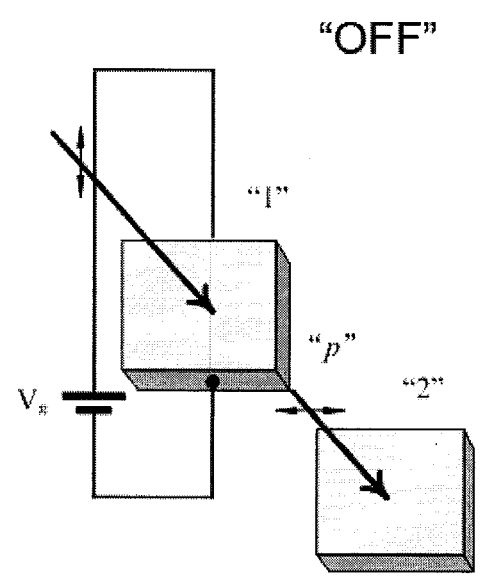

FIGS. 4A and 4B illustrate a polarization-dependent optical switch according to one embodiment of the present invention. In FIGS. 4A and 4B, "1" and "2" denote the Pockels cell and the metamaterial, respectively. FIG. 4A shows the optical switch being tuned on, where the external incident light can traverse in the metamaterial if the incident light is "s" polarized and the voltage on the Pockels cell is zero. FIG. 4B shows the optical switch being turned off and most light is blocked by the metamaterial, where the polarization of the incident light is changed to "p" and the half-wave voltage is exerted on the Pockels cell.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An optical switch, comprising:
   a Pockels cell; and
   a metamaterial combined with the Pockels cell, the metamaterial including
      a pair of metal strips in a lower layer on a glass, the pair of metal strips having a photopolymer as a filler, the pair of metal strips being of substantially equal length and extending in parallel to each other in a longitudinal direction, one metal strip of the pair being offset relative to the other by a predetermined distance in the longitudinal direction, the predetermined distance being a parameter for controlling plasmon hybridization, and
      a single metal strip in an upper layer extending perpendicularly to the pair of metal strips,
   wherein polarization of the incident light on the Pockels cell is controlled by a voltage applied to said Pockels cell.

2. The optical switch according to claim 1, wherein the metamaterial comprises a plasmon-hybridized metamaterial including a gold or silver strip in nanoscale.

3. The optical switch according to claim 2, wherein the optical switch is turned on or off depending on the polarization of the incident light, and
   wherein, when the polarization of the incident light is parallel to the single metal strip and perpendicular to the pair of metal strips, the optical switch is turned on.

4. The optical switch according to claim 2, wherein the optical switch is turned on or off depending on the polarization of the incident light, and
   wherein, when the polarization of the incident light is perpendicular to the single metal strip and parallel to the pair of metal strips, the optical switch is turned off.

5. The optical switch according to claim 1, wherein the optical switch is turned on or off depending on the polarization of the incident light,
   and
   wherein, when the polarization of the incident light is parallel to the single metal strip and perpendicular to the pair of metal strips, the optical switch is turned on.

6. The optical switch according to claim 1, wherein the single metal strip in the upper layer has the same resonant frequency as that of the pair of metal strips in the lower layer depending on a length of the single metal strip.

7. The optical switch according to claim 1, wherein the optical switch is turned on or off depending on the polarization of the incident light,
   and
   wherein, when the polarization of the incident light is perpendicular to the single metal strip and parallel to the pair of metal strips, the optical switch is turned off.

8. The optical switch according to claim 1, wherein the predetermined distance is determined such that the pair of metal strips in the lower layer in a symmetric mode has the same resonant frequency as that of the pair of metal strips in an asymmetric mode.

9. The optical switch according to claim 1, wherein the voltage on the Pockels cell controls a phase of the incident light.

10. A method of providing an optical switch, the method comprising:
    preparing a metamaterial including
       stacking a pair of metal strips in a lower layer on a glass, the pair of metal strips being of substantially equal length and extending in parallel to each other in a longitudinal direction, one metal strip of the pair being offset relative to the other by a predetermined distance in the longitudinal direction,
       filling a photopolymer between the pair of metal strips, and
       stacking a single metal strip in an upper layer extending perpendicularly to the pair of metal strips,
    combining a Pockels cell and the metamaterial; and
    controlling polarization of an incident light by a voltage on the Pockels cell.

11. The method according to claim 10, wherein the optical switch is turned on or off depending on the polarization of the incident light, and
    wherein, when the polarization of the incident light is parallel to the single metal strip and perpendicular to the pair of metal strips, the optical switch is turn on.

12. The method according to claim 10, wherein said stacking a single metal strip further includes setting a length thereof such that the single metal strip in an upper layer has the same resonant frequency as that of the pair of metal strips in the lower layer.

13. The method according to claim 10, wherein the optical switch is turned on or off depending on the polarization of the incident light, and
    wherein, when the polarization of the incident light is perpendicular to the single metal strip and parallel to the pair of metal strips, the optical switch is turned off.

* * * * *